(12) United States Patent
Gagel et al.

(10) Patent No.: US 10,733,314 B2
(45) Date of Patent: Aug. 4, 2020

(54) METHOD FOR PROTECTING A NETWORKED MILITARY SYSTEM AND NETWORKED MILITARY SYSTEM

(71) Applicant: DIEHL DEFENCE GMBH & CO. KG, Ueberlingen (DE)

(72) Inventors: Florian Gagel, Uhldingen-Muehlhofen (DE); Andre Selz, Ueberlingen (DE); Andreas Koltes, Ueberlingen (DE); Joerg Kushauer, Deggenhausertal (DE)

(73) Assignee: Diehl Defence GmbH & Co. KG, Ueberlingen (DE)

(*) Notice: Subject to any disclaimer, the term of this patent is extended or adjusted under 35 U.S.C. 154(b) by 288 days.

(21) Appl. No.: 15/950,604

(22) Filed: Apr. 11, 2018

(65) Prior Publication Data

US 2018/0300495 A1    Oct. 18, 2018

(30) Foreign Application Priority Data

Apr. 12, 2017   (DE) .................. 10 2017 003 585
Jul. 12, 2017   (DE) .................. 10 2017 006 572

(51) Int. Cl.
  *G06F 21/62*    (2013.01)
  *H04L 29/06*    (2006.01)

(52) U.S. Cl.
  CPC ...... *G06F 21/6218* (2013.01); *H04L 63/0823* (2013.01); *H04L 63/104* (2013.01); *H04L 63/123* (2013.01); *H04L 63/1425* (2013.01); *G06F 2221/2117* (2013.01)

(58) Field of Classification Search
  CPC ......... G06F 21/6218; G06F 2221/2117; H04L 63/0823; H04L 63/104; H04L 63/1425; H04L 63/123
  See application file for complete search history.

(56) References Cited

U.S. PATENT DOCUMENTS

| | | |
|---|---|---|
| 2016/0261404 A1 | 9/2016 | Ford et al. |
| 2017/0046526 A1 | 2/2017 | Chan et al. |
| 2018/0248982 A1 | 8/2018 | Hubbard et al. |
| 2018/0270244 A1* | 9/2018 | Kumar ............... B64C 39/024 |
| 2019/0180291 A1* | 6/2019 | Schnneling ........ G06Q 30/0185 |

FOREIGN PATENT DOCUMENTS

| | | |
|---|---|---|
| DE | 102015006754 A1 | 11/2016 |
| WO | 2017027648 A1 | 2/2017 |
| WO | 2017042527 A1 | 3/2017 |

OTHER PUBLICATIONS

Konstantinos, C., et al. "Blockchains and Smart Contracts for the Internet of Things" IEEE Access.
(Continued)

*Primary Examiner* — Olugbenga O Idowu
(74) *Attorney, Agent, or Firm* — Laurence A. Greenberg; Werner H. Stemer; Ralph E. Locher

(57) ABSTRACT

In a method for protecting a networked military system from malicious users, transactions between the users of the networked military system are stored in a distributed database. Using a block chain method makes it possible to securely store important information in the network and to protect it from manipulation by intruders.

26 Claims, 2 Drawing Sheets

(56) References Cited

OTHER PUBLICATIONS

Neil B. Barnas: "Blockchains in National Defense: Trustworthy Systems in a Trustless World", Blue Horizons Fellowship Air University, Jun. 30, 2016 (Jun. 30, 2016), pp. 1-43, found on the Internet (Aug. 8, 2018), XP055500922 http://www.jcs.mil/Portals/36/Documents/Doctrine/Education/jpme_papers/barnas_n.pdf?ver=2017-12-29-142140-393.

Duncan Riley: "DARPA wants someone to build the DoD a new secure Blockchain based messaging platform", Apr. 25, 2016 (Apr. 25, 2016), found on the Internet (Dec. 12, 2017), XP055434364 https://siliconangle.com/2016/04/25/darpa-wants-someone-to-build-the-dod-a-new-secure-blockchain-based-messaging-platform/.

Konstantinos Christidis: "Blockchains and Smart Contracts for the Internet of Things", IEEE Access, vol. 4, Jun. 3, 2006 (Jun. 3, 2006), pp. 2292-2303, found on the Internet (Jun. 3, 2006), XP011613134, DOI: 10.1109/ACCESS.2016.2566339.

\* cited by examiner

METHOD FOR PROTECTING A NETWORKED MILITARY SYSTEM AND NETWORKED MILITARY SYSTEM

CROSS-REFERENCE TO RELATED APPLICATION

This application claims the benefit, under 35 U.S.C. § 119, of German patent application DE 10 2017 003 585.7, filed Apr. 12, 2017 and of German patent application DE 10 2017 006 572.1, filed Jul. 12, 2017; the prior application is herewith incorporated by reference in its entirety

BACKGROUND OF THE INVENTION

Field of the Invention

The invention relates to a method for protecting a networked military system from malicious users.

Many different parties, inter alia observers, spotters, sensors (for example radar), effectors, troops in deployment, general weapons, control and command centers for example, are involved in a networked military system. All of these parties are users of the networked military system.

Within such a networked military system, different transactions take place between the users, starting with the identification and verification of the respective users with respect to one another for example, interchange of information relating to threats or targets, transmission of commands over hierarchical levels up to the combating of the opponent by means of effectors and subsequent damage assessment.

It is known practice to protect networked military systems for protection from malicious users, also called intruders, by use of physical apparatuses or to redundantly design such a system, with the result that a replacement system can take over in the event of a failure.

SUMMARY OF THE INVENTION

An object of the invention is to specify a method for protecting a networked military system from a malicious user who has managed to become a user of the system across existing physical security mechanisms, in particular.

This object is achieved by a method of the type mentioned at the outset, in which transactions between users of the networked military system, in particular transactions to be protected, are stored in a distributed database according to the invention.

The invention is based on the consideration that many transactions between the users presuppose authentication of the users involved and accurate logging of the transactions for the purpose of reproducibility.

The invention is also based on the consideration that decentralized systems are advantageous for reasons of robustness with respect to enemy actions since this also allows failure of a part of the complete networked military system without affecting the overall functionality or endangering the operation carried out or to be carried out.

The invention identifies that a disadvantage of distributed systems is the trust of the users with respect to one another since it must also be expected that intruders/saboteurs have taken over individual users and as a result can act as malicious users. Such a malicious user has hitherto been able to both initiate harmful transactions and to subsequently corrupt the logging of transactions with appropriate access.

In order to solve this problem, it is proposed that transactions of predetermined categories, in particular all transactions of such a decentralized network, that is to say of the networked military system, are stored in a distributed database. Such a distributed database is also referred to as a "block chain" below.

In this respect, in one advantageous embodiment of the invention, the database is stored in a plurality of users. In this case, the entire database can be stored in all or some users. It is useful in this case for it to be visible to a predetermined group of users, in particular to all users. In this manner, the users can comprehend earlier transactions or can verify new transactions on the basis of earlier transactions by accessing the database.

Another possibility is for the database to be divided among a plurality of users, that is to say for only parts of the database to be stored at least in some users, rather than being stored in its entirety in each of the users. In this case too, the database should be retrievable overall for the users by accessing the parts.

The invention can be advantageously used for all conceivable users of a networked military system, including persons and vehicles, in particular aircraft and/or watercraft. Users may be one or more data processing systems in a building, mobile communication devices such as smart phones or other computer-based handheld devices, missiles, projectiles and/or weapons. The desired or correct users of the networked military system, generally also referred to as a network, are referred to as "users" below or else as authorized or approved users and malicious users are referred to as "intruders" or "malicious users".

The invention can be applied in a particularly advantageous manner to an air defense system. The latter may contain, as the users, a tactical operation center (TOC), at least one sensor system for air monitoring—for example a radar system—and at least one effector system, for example a launcher for starting surface-to-air missiles, a high-energy laser system or a gun-based effector system, for averting threats, for example flying objects. It is possible to counteract a disruption of such a military system, with the result that reliable air defense is achieved.

A transaction may be information interchanged between two network users. In particular, any information interchanged between two network users is a transaction. The transactions may be in particular, for example, the registration of a new user, authorization of a user or a transfer of rights of one command center to another command center, for instance. Any actions of predetermined categories within the network, that is to say within the networked military system, in particular all actions, can be advantageously checked and understood by all users at any time on the basis of the stored transactions—intact network access is presupposed here.

The transactions at least contain, in particular, information from the group of:
a) movement data relating to threats which are captured by a sensor system, for example flying objects, so-called track data,
b) shots or orders to fire,
c) identification of threats such as flying objects, in particular aircraft or missiles,
d) allocation of a target to an effector system, for example a launcher,
e) logon data of users in the network,
f) states of users,
g) geographical locations of users, and
h) network rules.

The integrity of the distributed database is cleverly verified by the users using predefined algorithms. As a result, it is secure with respect to manipulations by individual malicious users. Such a manipulation would result in the immediate identification of an intruder and in the exclusion of one or more system components connected thereto, but without restricting the operation of the distributed main system or network with users.

One possibility for such a checking algorithm involves storing the transactions in blocks which follow one another. The contents thereof are expediently networked to one another. The networking can be carried out in such a manner that a check code formed from at least one preceding block is stored in a block. The check code may be a checksum. The check code can be determined by means of hashing, with the result that a hash value of the information from at least one preceding block is stored in the block. Such concatenation of data blocks is known from block chain technology.

In this case, it is possible to stipulate as a rule in the network that a transaction among the users is considered to be true if the transaction is stored in a block and the block is attached to a chain of blocks. If branches of the chain are possible, the contents of the blocks in the longest chain can be considered to be true. In this respect, the users agree that such transactions, generally also referred to as information, are true irrespective of their factual truth content. A block can be attached by inserting the check code into the block which therefore clearly indicates the position of the block in the chain.

The use of block chain technology opens up new possibilities, by which the distributed database, that is to say the decentralized transaction database, can be checked by all users at any time. As a result, the entire system, that is to say the networked military system, is still functional even if individual users fail or are excluded and is no longer dependent on a central node which is currently also often redundantly designed in order to ensure the required operational reliability. It is advantageous that the transactions themselves are both stored and verified in a very short time and manipulations by individual malicious users can also be immediately recognized. In addition, the method is very fast, assuming appropriate computing power, and transactions can take place within milliseconds.

The use of block chain technology for networked military systems, that is to say the storage of all transactions between users of the networked military system in a distributed database, provides, on the one hand, an additional security mechanism for protecting transactions and identifying malicious users and, on the other hand, also makes it possible to distribute the logging database in a decentralized manner. The database is protected from the failure of individual users and cannot be manipulated by malicious users.

It is therefore expedient that transactions within the networked military system are stored in a decentralized manner in a block chain. Participating stations or network users may simultaneously act as nodes in this case and may keep their own copy of the block chain database. In this case, these nodes advantageously additionally verify the transactions within the network. This can take place by use of public keys of the users.

The users are generally advantageously equipped with a private key which is expediently secret and, in this respect, is known only to the one user to whom the private key belongs. A public key can be generated from the private key and is published to some or all other network users. Transactions are expediently published in an encrypted form in the network. The encryption expediently takes place using the private key in this case. The transaction can be decrypted by means of the public key. Since the latter is public, any user can decrypt the transaction. The transaction can be identified as verified using the decryption and, in particular, the check that the decryption took place using the public key of that user who transmitted the transaction.

Depending on the fundamental rule within the network, an item of information or a transaction can be considered to be verified if the majority of users in the network confirm the verification (also see "Byzantine generals" or "Byzantine faults"). Another possibility involves that user who has generated the current block and fills the latter with data relating to the transactions verifying the transactions and storing the verified data in the block. If the block is attached to the block chain, the transaction can be considered to be true and is stored in the block chain as a basic truth which cannot be falsified.

When using data blocks which follow one another, it may take a while for a transaction to be stored in a current block and for the block to be attached to the existing block chain. Only then is the transaction considered to be true and therefore completely reliable. This applies irrespective of the type of block generation by means of so-called mining (Proof of Work) or an algorithmic allocation of block generation (Proof of Stake). However, in a military system, in particular an air defense system, it may be necessary to react very quickly to threats or other information. It is therefore necessary to clarify the matter of when a transaction, for example an order to fire in order to combat an approaching missile, is considered to be reliable and should therefore be carried out.

A distinction is therefore made below between an unchecked transaction, a verified transaction and its recognition as true. An unchecked transaction is the order to fire per se, for example. It is verified if it has been checked—for example by the addressee, in this example a launcher for starting a ground-to-air missile—for example by the decryption using the public key of the sender. A transaction becomes true if it is included in a block which has been attached to the block chain. However, it is sufficient if an only verified transaction is recognized as executable, that is to say even if it is not yet part of the block chain. The verification can be carried out very quickly, with the result that orders can be implemented in a sufficiently quick manner.

However, if the verification is not satisfactorily achieved or is not satisfactorily achieved in a predetermined manner, the information from the transaction is classified as non-executable or more generally: not reliable. A sender can be checked and, where possible, can be excluded from the system. Exclusion of a user is registered by all other users without impairing their own operational capability or that of the system, which results in further robustness of the overall system.

In order to set up a decentralized block chain network, it is useful to create a secure basic configuration. Inviolable basic information is expediently inserted into a basic block. A basic block may be the first block in the block chain. It may also consist of a plurality of blocks which are at the start of a block chain. This basic block should contain basic information relating to the users and should be created in an environment which is more protected than a subsequent regular operating environment. This makes it possible to counteract the undesirable importing of incorrect information by an intruder.

A basic group of users should be defined in a basic block, that is to say a group of authorized or approved users.

One possibility for forming a protected environment may be the wired networking of the users when creating the basic block. This makes it difficult to intervene in the network from the outside. The wired basic users are advantageously in a single building when creating the basic block. This makes it possible to form a cable network which is closed to the outside and is extremely difficult to enter.

Another possibility for forming a protected environment when creating the basic block can be provided by networking the basic group only after the creation of the basic block. The basic block may be formed by a single basic user, for example a command center or a tactical operation center (TOC), in particular without existing networking to a wireless network or to a network outside the building in which the command center is situated.

The users are advantageously networked for the purpose of interchanging certificates, for example their public key, in a protected environment, for example in a depot. In this case, the networking is cleverly carried out using a protected medium, for example a wired connection. The protected environment therefore differs from the regular operating environment, and the networking medium can also differ. Both wireless networks and wired connections or both can be used in the regular operating environment. It is possible to create a secure basic configuration, after the creation and secure storage of which in blocks the regular operation only begins with a wireless network, for example. It is possible to counteract already initial undesirable influencing of basic data.

It is likewise advantageous if the users are first of all networked to one another in a wired manner and interchange certificates, for example interchange their public key, and the wired connection is then removed between at least some of the users and a wireless network is set up between these users.

If the transactions are stored in blocks, it is useful if the blocks are created according to a defined algorithm. This rule is expediently defined in a basic block. Instead of mining, the proof of stake method is advantageous, in which case the term "stake" need not be restricted to material proportions of the network, for example proportions of the computing power of the network.

The algorithm expediently proportionately divides the rights for creating blocks among the users. For example, each user is given a proportion of the overall creation rights which is then de facto statistically allocated to him using the algorithm during operation. For example, if a user is given 5% of the creation rights for creating blocks, he will actually create approximately 5% of the blocks, statistically speaking, over the course of regular operation, the value also being able to briefly differ considerably therefrom.

A useful approach to distributing the proportions among the users is the calculation using the data security of the individual users. A data-secure user, for example a command center, is given a higher proportion than a less secure user. A wiring state can also be taken into account in the allocation of the proportions, with the result that a user wired to at least one further user in the network, for example, is given a higher proportion than a user only wirelessly connected to the other network users and a user exclusively wired in the network, in particular, is given higher proportions than a user connected to users in a partially wired manner and partially wireless manner.

It is also advantageous if the algorithm distributes the rights for creating blocks according to a pseudo-random method. Although such a method deterministically stipulates the individual block creation rights, it cannot be predicted from the outside—without knowledge of a creation parameter—that is to say appears to be a random method from the outside. In this case, it is expedient if the allocation of the individual rights, which is to say for creating a block, is comprehensible for each user since the allocation can be checked thereby. The allocation of the individual creation rights for each user can advantageously be calculated in advance with an average certainty of more than 50%, thus increasing the ability to check from the outside.

In the case of a closed block chain network, it is useful to clearly define the boundaries to the outside in order to prevent or at least impede unauthorized entry of an intruder. A particularly rigorous delimitation with respect to the outside can be effected if the transactions are stored in blocks and only users registered in a basic block can generate such data blocks. It is not possible to add new users thereby, with the result that the original users of the network remain amongst themselves. This may be advantageous particularly in military systems. Greater variability of the network while reducing the rigour of the external boundaries can be achieved if new users can enter the network, but are first approved as approved new users in the network according to a predetermined approval method. The approval method is expediently represented in a basic block of the block chain.

A particularly secure possibility for approving a new user in the network or system provides for a user not yet approved in the network to be approved as a new user in the network only when a user authorized for the new inclusion approves the new user. A user authorized for the new inclusion is expediently a user who has better shielding to the outside, with respect to its data security, than the average of the other users, in particular has the best shielding.

The security when newly including users can be increased if a user not yet approved in the network is approved as a new user in the network only when a plurality of users authorized for the new inclusion unanimously approve the new user.

The user authorized for the new inclusion is advantageously registered as such in a basic block. This makes it possible to counteract subsequent manipulation of a new inclusion. Further protection against hacking of a user authorized for the new inclusion can be achieved if the decision to newly include a user is unanimously made by one or more persons authorized for this. The authorization or a rule on which the authorization is based can be stored in a basic block.

In order to further increase the security against unauthorized entry, provision may be made for a new user to be approved as an approved user in the network only when at least one plausibility check with respect to the new user using information from blocks of a block chain is positive.

Transactions and information interchanged in the network and stored in a block and attached to a block chain in the block are expediently considered to be true. In order to avoid factual untruths entering the block chain as truths, it is advantageous if the transactions are stored in blocks and only data relating to users registered in a basic block and—if there are approved new users—new users approved thereby can be inserted into these data blocks. Although information relating to unapproved users in the network can be interchanged, it does not reach the status of a truth.

Communication in the network or system and/or courses of actions of users can be stipulated by means of rules. In this case, it is expedient to distinguish between fundamental rules and dynamic rules. A fundamental rule may be an unalterable rule, whereas a dynamic rule can be changed, newly generated and/or rejected. A fundamental rule, in particular all fundamental rules, is/are indicated as such. They are expediently stored in a basic block.

It is also expedient if at least one fundamental rule defines the creation of dynamic rules, with the result that they are protected from manipulation. Protection from the manipulation of fundamental rules can be improved if fundamental rules of the network are hardware-stored in at least one user.

In order to protect a fundamental rule, it is also advantageous if the users are networked, for example for the initial creation of the network or system, and a fundamental rule stored in a user is inserted into a basic block when creating the latter. This makes it possible to prevent the fundamental rule from being changed.

The invention is also directed to a networked military system having a plurality of users, in which transactions between the users are stored in a distributed database. The database may be divided among the users. The database is expediently respectively completely stored in a plurality of users, in particular in all users. The system is advantageously configured to carry out the method according to the invention.

The description given above of advantageous configurations of the invention contains numerous features which are partially reproduced in a manner combined as a plurality in some dependent claims. However, the features can expediently also be considered individually and be combined to form useful further combinations, particularly with dependency references of claims, such that an individual feature of one dependent claim can be combined with an individual feature, a plurality of features or all features of another dependent claim. Moreover, these features can be combined in each case individually and in any suitable combination both with the method according to the invention and with the apparatus according to the invention according to the independent claims. In this regard, method features should also be considered to be worded substantively as properties of the corresponding apparatus unit, and functional apparatus features should also be considered to be worded substantively as corresponding method features.

The above-described properties, features and advantages of this invention and the way in which they are achieved will become clearer and more clearly understood in association with the following description of the exemplary embodiments which are explained in greater detail in association with the drawings. The exemplary embodiments serve for explaining the invention and do not restrict the invention to the combination of features that is indicated therein, not even with regard to functional features. Moreover, features of each exemplary embodiment that are suitable therefor can also explicitly be considered in isolation, be removed from one exemplary embodiment, be introduced into another exemplary embodiment in order to supplement the latter and/or be combined with any arbitrary one of the claims.

Other features which are considered as characteristic for the invention are set forth in the appended claims.

Although the invention is illustrated and described herein as embodied in a method for protecting a networked military system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
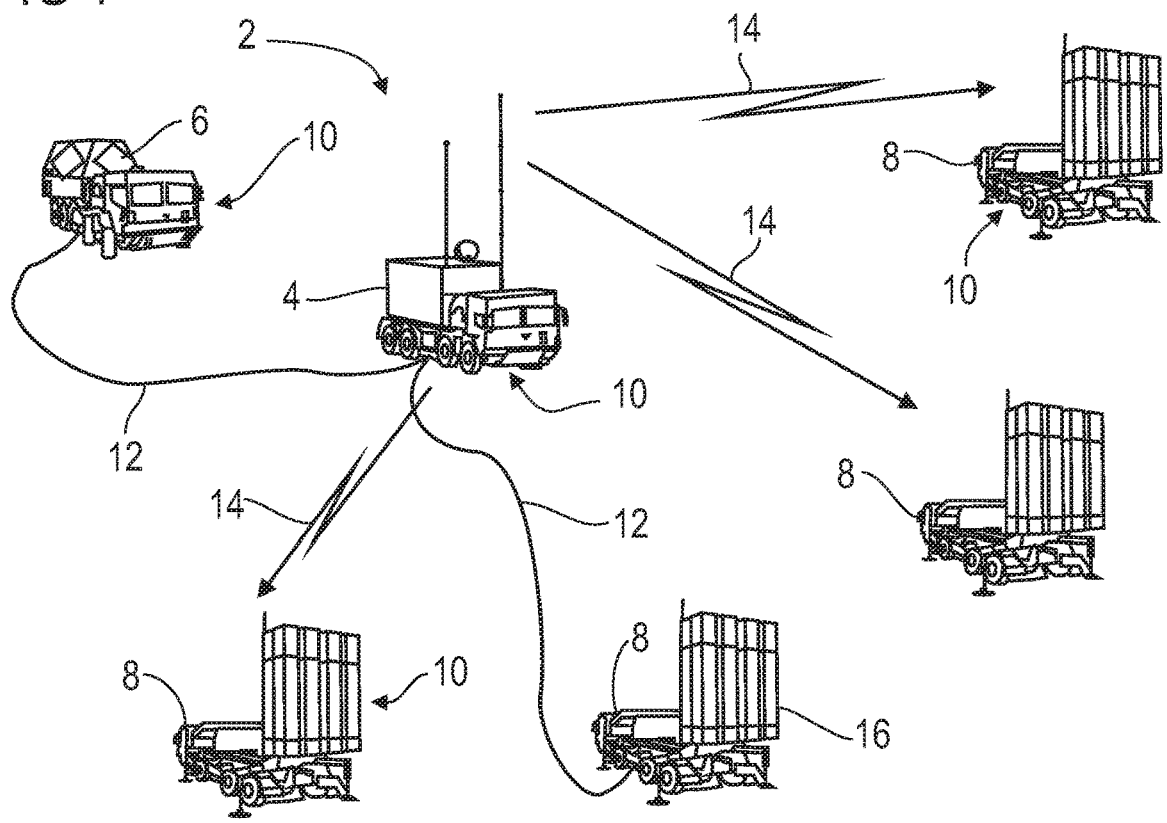
FIG. 1 is an illustration of a networked military system in the form of an air defense system according to the invention.

Referring now to the figures of the drawings in detail and first, particularly to FIG. 1 thereof, there is shown a networked military system 2 which is also referred to below as a network 2 in a simplified and generalized manner. The system 2 contains a command center 4, also called a technical operation center (TOC), which is connected to a sensor system in the form of a radar system 6 via an optical fibre cable 12. The radar system 6 is used for airspace monitoring and, with the command center 4 and a plurality of effector systems in the form of launchers 8, forms a networked air defense system. In this networked military system 2 or air defense system, the command center 4, the radar system 6 and the launchers 8 form users 10 of the network 2.

The launchers 8 are distributed over a large area in order to be able to defend a large area against air attacks. However, one of the launchers 8 is in the vicinity of the command center 4 and is connected to the latter via an optical fiber cable 12—generally: data cable—and the radar system 6 is connected to the command center 4. The other launchers 8 are far away from the command center 4 and are connected to the latter via a wireless connection 14, as is illustrated by the jagged arrows in FIG. 1. The launchers 8 comprise a plurality of canisters 16 from which one or more surface-to-air missiles can be started in order to intercept an approaching missile. The launchers 8 are controlled from the command center 4 which has taken over the control of the launchers 8 in a remote control, with the result that the personnel of the individual launchers 8 are freed from the operation of the launchers 8 and are posted only at some distance from the respective launcher 8 in order to defend it. All users 10 are mobile and, in this respect, are placed on vehicles, with the result that they can be moved quickly and, if necessary, can also quickly escape from attacks.

The network 2 is a network which is closed to the outside and in which the users 10 communicate with one another, but no further user otherwise has access to this network 2. Although networking to the outside exists as a result of the command center 4, generally speaking as a result of a central user 10, it is not possible to communicate with one of the users 10, apart from the central user 10, from outside the network 2. Such communication would be possible only as a result of a malicious user entering the network 2 in an unauthorized manner.

For unauthorized entry, there are generally two possibilities which are referred to below as software break-in and hardware break-in in a simplified manner. In the case of a hardware break-in, hardware is taken over by a malicious user; for example, a launcher is seized by a group of enemy paratroopers and continues to be operated thereby without the other users 10 of the network 2 gaining knowledge of such a break-in. In the case of a software break-in, a malicious user enters the network 2 in an unauthorized manner by means of a programming and/or communication activity. Such hacking can be carried out remotely and without the physical takeover of a user 10.

In order to protect against a malicious user entering the network 2 in an unauthorized manner, the network 2 is equipped with a distributed database 20 (FIG. 2), the contents of which are entirely or at least partially distributed among a plurality of users 10 of the network 2, in particular among all users 10 of the network 2. This is illustrated below using the diagram from FIG. 2.

Figure 2:
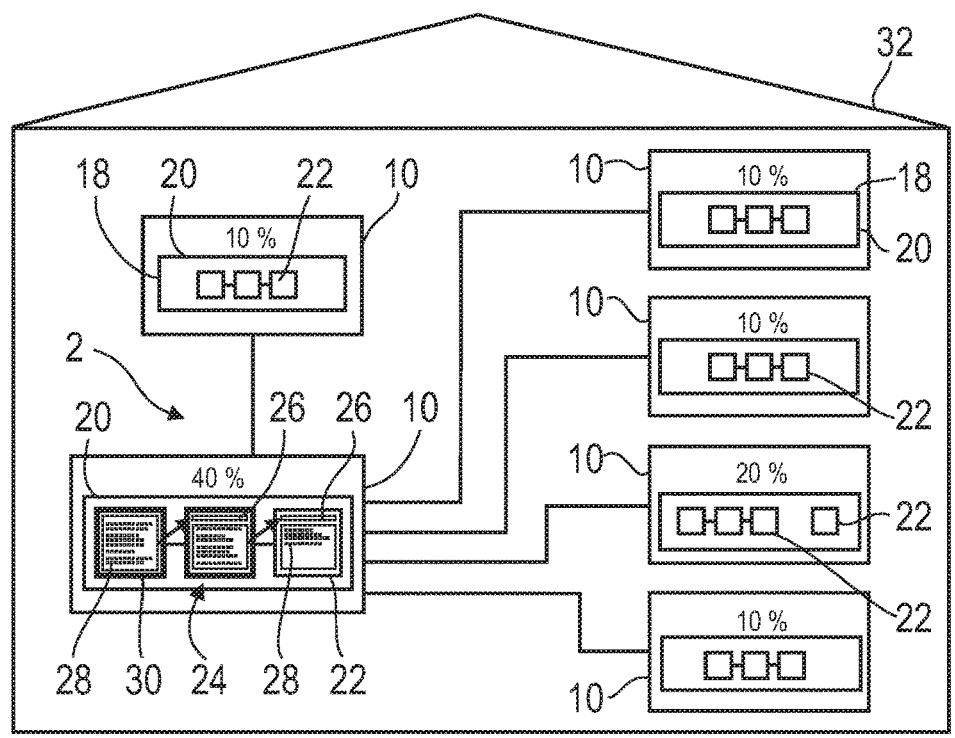
FIG. 2 is a diagram of a setup of the networked military system in a building.

FIG. 2 shows a schematic illustration of the users 10 of the network 2. Each user 10 is equipped with a data processing system 18 which—in simplified terms—contains a database 20 which is depicted in an identical manner to the data processing system 18 in FIG. 2 for the sake of graphical clarity. It goes without saying that it is also possible for the database 20 to be stored anywhere inside the user 10 and for the data processing system 18 to have access to the database. The important factor is that the database 20 and the data processing system 18 are present inside the respective user 10, that is to say access is possible without an activity of the network 2 or a transaction via a data cable 12 or a wireless connection 14. For example, the data processing system 18 and the database 20 are stored inside the same vehicle, in which case this likewise applies to a plurality of or all users 10 of the network.

Communication in the network 2 can be carried out by broadcast, in particular in the wireless network, as indicated by the wireless connections 14 in FIG. 1. Such a broadcast can also be carried out via the wired connections 12, with the result that a transaction between two or more users 10 is public to all users 10. However, it is likewise quite possible for transactions between users 10, that is to say instructions from one user 10 to at least one other user or, in the broadest sense, information interchanged between two users 10, to be addressed and to be made available only to one user 10 or to a plurality of addressed users 10 without this transaction being made available to the other users 10. The important factor in this case is only that such a non-public transaction is subsequently made public to all users 10 in a block 22.

All transactions between users 10 or those transactions in the network 2 which are catalogued as having to be permanently stored by a stipulated catalogue are entered in a block 22 which is attached to a block chain 24. The block chain 24 therefore stores all transactions or all transactions considered to be important, in particular all information interchanged between users 10 of the network 2. In this respect, the block chain 24 forms a database 20 containing all such transactions. The block chain 24 is not only available to all users 10 of the network 2 but is also distributed among a plurality of users, in particular all users 10, of the network 2. In the exemplary embodiment illustrated in FIG. 2, the block chain 24 currently consists of three blocks 22, for example, which are stored in the database 20 of each user 10. However, it is also possible to break up the block chain 24 and to individually provide the users 10 with only portions, but it is important for the users 10 to have access to all blocks 22 in the entire block chain 24 by accessing a plurality of databases 20 of a plurality of users 10. However, the simplest process is to completely store the block chain 24 in all users 10.

The blocks 22 in the block chain 24 are networked to one another. This networking is carried out not only by means of the concatenation, but rather by virtue of the contents of one or more, in particular all, preceding blocks 22 being stored in a manner combined to form a check code 26 in the next block 22, for example in the header of the following block 22. The check code 26 may be a hash value which is formed from the contents of the block(s) 22. FIG. 2 illustrates how a first block 22—on the left in the block chain 24—contains a number of transactions 28 which are illustrated by dots in the block 22 in FIG. 2. The contents of the first block 22 are combined to form a check code 26, for example a hash value, and are stored in the following block 22. The second block 22 is likewise entirely or partially filled with transactions 28 and additionally simply contains the check code 26. The third block 22 contains a check code 26 which is formed from the entire contents of the preceding blocks 22, for example a hash value of the contents of all preceding blocks 22. The check code 26 is again stored in the header of the third block 22. The third block 22 is also entirely or partially filled with transactions 28, etc. The networking of the blocks 22 has the advantage that a subsequent change of the contents of a block 22 would entail a change of all blocks 22 in the block chain 24. However, since these blocks 22 are stored in all users 10 of the network 2, the change in the blocks 22 in one user 10 does not suffice, with the result that a subsequent systematic change in the transactions 28 in the blocks 22 following one another is possible only with difficulty. It is therefore visible to all users 10 at any time which transactions 28 are present in the block chain 24, in which case the truth content of these transactions 28 or blocks 22 is relied on.

If a malicious user manages a software break-in or even a hardware break-in to the network 2, it is not possible for him to subsequently change the transactions 28 on which the network 2 relies without this being apparent as a result of inconsistencies in the individual databases 20 of the users 10. As a result, a change would be immediately clear to all users 10. Measures for averting resulting consequences can be taken. It is also not possible for a malicious user to engage between two users 10 of the network 2 and to pass different information to the two users 10. If, for example, a user settles between the command center 4 and a launcher 8 and simulates a command center to the launcher 8 and simulates the alleged launcher to the command center 4, different information would be passed to the command center 4 and to the launcher 8. This information would have to be written to the current block 22 as transactions 28, with the result that the discrepancy between the information or transactions 28 will be apparent to the other users 10. The break-in would be identified and countermeasures can be taken.

In order to additionally protect the system 2, all transactions between users 10 are encrypted using a private key, each user 10 having an individual private key. This private key is known only to the relevant user 10. Each user 10 generates a public key from his own private key and provides this public key to the network 2, with the result that each public key is also stored in the block chain 24. A transaction 28 between two users 10 is encrypted by the transmitting user 10 using his private key and can then be decrypted by other users 10 or the recipient(s) by means of the public key of the transmitting user 10. This makes it possible to unequivocally determine the user 10 from whom the transaction 28 originates. In the case of a software break-in, the malicious user who has broken in would have to gain possession of the private key of the user 10 in order to be able to transmit incorrect information in the network 2 without detection. This is difficult if the private key of each user 10 is accordingly stored in a secure manner. In the case of a hardware break-in, the malicious user can reach the private key and can supply incorrect information to the network 2 without detection. This is not immediately discernible to the other users 10 if the original user 10 subjected to a hostile takeover by the malicious user cannot additionally register in the network 2. However, the malicious user can be detected in this case on the basis of plausibility checks which are carried out on the basis of the transactions 28 from the block chain 24, as described below.

In order to create the blocks 22, the network 2 contains an algorithm, according to the rules of which the blocks 22 are created. This algorithm is also stored in the block chain 24. In the exemplary embodiment illustrated, the algorithm divides the rights to create blocks among the users 10. Each of the users 10 is therefore given the possibility to create a block 22, the sequence for creating the blocks 22 being defined by the algorithm. In the exemplary embodiment shown in FIG. 2, the rights for creating the current block are with the second lowest user 10 in the right-hand column. The user 10 fills the block 22 created thereby with transactions 28 and then attaches the block 22 to the block chain 24, as predefined by the algorithm. The block 22 is closed at the latest by attaching the current block 22 to the block chain 24, with the result that transactions 28 can no longer be entered in the block. For example, the entry of the check code 26 is the last entry in the block 22 before it is attached to the block chain 24. The attached block 22 is sent to all users 10 for storage in the databases 20, with the result that each user 10 has the current information. Those transactions 28 which are registered in a block 22 attached to the block chain 24 are considered to be true and reliable among the users 10.

A further user 10 is now given the possibility to create a block 22 according to the rules of the algorithm. These rules may provide for the rights to create blocks 22 to be proportionately divided among the users 10 of the network 2. In the exemplary embodiment shown in FIG. 2, one of the users 10, for example the command center 4, has a proportion of 40%, as illustrated in FIG. 2. Four further users 10 each have a proportion of 10% and one user 10 has a proportion of 20%. The proportions may be stipulated among the users 10 by the algorithm according to the data security of the individual users 10. For example, the command center 4 has the best protection and is given the highest proportion, 40% in the exemplary embodiment. If a user 10 is wired to the command center 4, this signifies a higher data security which can be reflected in the calculation of the proportions. For example, the wired launcher 8 has a proportion of 20%. Since the radar 6 is a primary target for enemy air attacks, it has a lower proportion than the wired launcher 8—despite its relatively high data security—and therefore also only has a proportion of 10%, for example. The rights for creating blocks are distributed in accordance with the algorithm according to a pseudo-random method. It is respectively subsequently possible for each user 10 with a predetermined level of security to verify the distribution for creating the current block 22, with the result that the distribution of the rights for creating the current block 22 is transparent to the users 10. In addition, only users 10 approved in the network 2 can create blocks 22, that is to say are recorded or approved in the algorithm. Only the transactions 28 of these users 10 can also enter the blocks 22 and can be stored there.

In the exemplary embodiment illustrated in FIG. 1, the following information, in particular, can be recorded as transactions in the block chain 24: missile movement data, so-called track data, captured by the radar system 6, shots or orders to fire issued by the command system 24, identifications of aircraft or missiles carried out by the radar system 6, the allocation of a target to a launcher 8 by the command center 4, logon data of users 10 in the network 2 if these users newly enter the network 2 or enter the network 2 again following an interruption, states of users 10 such as the operational readiness, the combat readiness, a technical defect, number and/or state of defensive missiles in canisters 16, geographical locations of users 10 and/or network rules. It is also useful to store complete sequences relating to detection, tracking, assessment, combat decisions, combat and damage assessment as transactions in the block chain 24 in order to be able to reconstruct the sequence without distortion at any time after an operation.

For example, the command center 4, as a user 10 of the networked military system 2, can verify its rights, that is to say its authorization for particular transactions, by a corresponding certificate. Such a certificate and/or the right per se may be a transaction. The transfer of rights, which also includes the inclusion of a new command center 4 via its certificate, is likewise a transaction which is stored in the block chain 24 and, as a result, is disclosed to all other users 10 in a manner which cannot be distorted. As a result, the transfer of the authority to another user 10, for example, is protected, is always comprehensible and is protected against possible intruders.

Basic information on which the transactions 28 of the network 2 are fundamentally based is stored in the block chain 24 in basic blocks 30. In FIG. 2, two such basic blocks 30 are highlighted by a bold border. These basic blocks 30 are the first blocks 22 in the block chain 24. It is possible to create one or more basic blocks 30, depending on the data capacity of the basic blocks 30 and the amount of basic information to be written. This is also referred to below as transactions 28 even if the information need not be interchanged between users 10 in the strict sense.

The users 10 of the network 2 may be entered in a basic block 30, in particular conclusively. A basic block 30 may also contain fundamental rules which cannot be changed. Such a fundamental rule may be the fact that transactions can be recorded in a block 22 only when they have been generated by a user 10 registered in the basic block 30. If it is possible to approve further users 10 for the network 2, transactions of such approved users 10 can also be entered in data blocks 22 which are attached to the block chain 24.

In order to avoid manipulation of basic information on which the entire communication in the network 2 is subsequently based, it is useful if a basic block 30 is created in an environment which is more secure than a subsequent regular operating environment. For example, all users 10 of a future network 2 within a building 32 are networked, as indicated in FIG. 2. The users 10 can now interchange transactions 28 in a protected environment, which transactions are stored in one or more basic blocks 30. Such transactions 28 may be fundamental rules which stipulate an action of a user 10 and/or interaction between the users 10. A fundamental rule of the network 2 may be hardware-stored in at least one user 10 and is transmitted, by means of the corresponding networking of the user 10 having the fundamental rule, to the user 10 who creates a basic block 30 and writes this fundamental rule to the basic block 30.

Alternatively or additionally, it is useful if the users 10 are networked to one another solely in a wired manner in order to create the basic blocks 30, as indicated in FIG. 2. As a result, it is considerably more difficult to break into this wired network 2. After the basic blocks 30 have been created, the wired connections can be entirely or partially removed and recourse may be had to wireless connections 14, for example, as illustrated in FIG. 1. The basic information then stored in the basic blocks 30 is correct and the network 2 can discover incorrect information generated by a subsequent break-in.

In the case of a relatively small network 2, the mutual wired networking for the purpose of creating the basic blocks 30 and/or the networking in a building 32 is/are useful initial protection. It is likewise useful for the users 10 per se to be indicated in a basic block 30, with the result that a malicious user cannot easily participate in the network 2 without being unmasked as malicious.

In a large network 2 having fluctuating users 10, for example, who can therefore come and go, such basic networking or such creation of basic blocks 30 is not readily possible. In this case, it is useful for the system 2 to be networked only after the creation of a basic block 30, in particular to only then be initially networked. The creation of one or more basic blocks 30 is the responsibility of a very secure user 10, for example, such as the command center 4. This user 10 creates one or more basic blocks 30 without networking, that is to say in an environment which is very secure with respect to a break-in. The basic blocks 30 then contain fundamental rules which stipulate approval and dismissal of new or leaving users 10.

Figure 3:
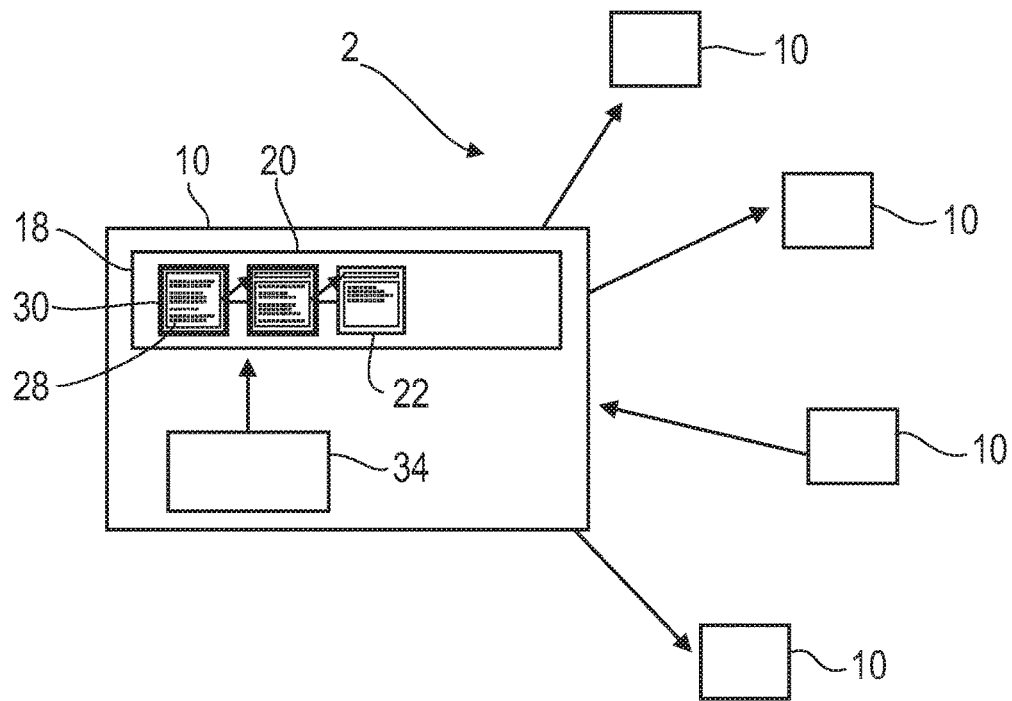
FIG. 3 is a diagram of a setup of another networked military system by means of requests from a command center.

Such a process is illustrated, by way of example, in FIG. 3. FIG. 3 shows a user 10 having a database 20 containing basic blocks 30 and a further block 22 attached to the basic blocks 30. The basic blocks 30 are created at the instigation of an operator 34 who, for this purpose, provides a data processing system 18 with data, on the basis of which the data processing system 18 creates the basic blocks 30. These basic blocks are checked and released by the operator 34, for example.

After one or more basic blocks 30 have been created, the user 10 transmits requests to other users 10, as indicated by the outgoing arrows in FIG. 3. In response to such a request, a requested user 10 is networked to the first user 10 according to the rules indicated in a basic block 30. Vice versa, it is also possible for an external user 10 to send a networking request to the first user 10, as indicated by the incoming arrow in FIG. 3. If the request or the requesting user 10 corresponds to the fundamental rules of a basic block 30, this user 10 is also accepted as an approved user 10 in the network 2 and is networked. The corresponding transactions, that is to say information relating to the users 10 per se, that is to say properties or data relating to the users 10, are stored as transactions 28 in the subsequent blocks 22, with the result that each user 10 knows the other users 10 of the network 2 and their properties. Such a procedure is useful in large networks 2 or in networks 2 having greatly fluctuating users 10.

Figure 4:
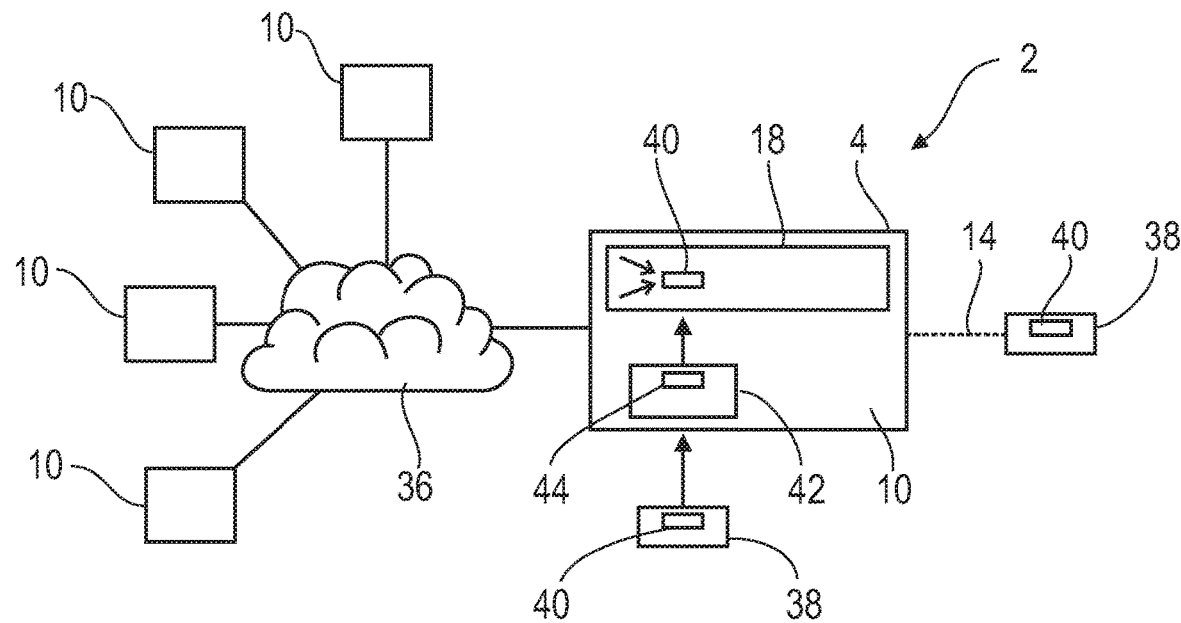
FIG. 4 is a diagram of communication of the networked military system from FIG. 3 during its regular operation.

One example of such a network 2 is explained below on the basis of the illustration from FIG. 4. The network 2 contains a multiplicity of users 10 networked to one another, in particular in a wireless manner, for example via a radio network 36 and/or the Internet. The network 2 is a large military system which includes, as users 10, persons and vehicles as well as a command center 4 and various weapons. The network 2 has been networked, for example, as described with respect to FIG. 3 and is in its regular operation.

One of the users 10 is a soldier 38 who is initially not part of the system 2, however, on account of a holiday. The system 2 is in Afghanistan, for example. After his holiday, the soldier 38 registers with a user 10 authorized for the new inclusion in the network 2, the command center 4 in this exemplary embodiment. The soldier carries a data storage medium which stores his public key 40. New users 10 in the network 2 can interchange transactions in the network as approved users 10 only when they are approved by a user 10 authorized for the new inclusion in the network 2. Such a user 10 authorized for the new inclusion is also registered as such in a basic block 30 of the block chain 24 of the system 2.

A person 42, for example an officer, now receives the data storage medium containing the public key 40 of the soldier 38 and supplies two data records to a data processing system 18, namely the data record containing the key of the soldier 38 and a data record containing his own public key 44. The key 44 contains the person as authorized to admit a new user 10 into the network 2.

For the public key 40 of the soldier 38, the data processing system 18 now uses transactions stored in the block chain 24 of the system 2 to check whether the new inclusion of the soldier 38 is plausible. Information assigned to the soldier 38 or his public key 40 is used for this purpose, as indicated by the two arrows in the data processing system 18 in FIG. 4. It is shown, for example, that the soldier 38 already left Frankfurt four days ago and arrived in Kabul three days ago and therefore needed three days to reach the command center 4. This period is too long and is not allowed in the check. A corresponding result is indicated to the person 42 by the data processing system 18. The latter can now check the soldier 38 with regard to his stay.

During the check to determine whether a new user can be approved in the network 2, rules stored in the block chain 24 are used. These rules may be fundamental rules or dynamic rules. In the example with the soldier 38, dynamic rules are used to check whether the new user 10 should be approved in the network 2. Each dynamic rule can be created only according to a fundamental rule which stipulates the creation and also the elimination of a dynamic rule again. The dynamic rule used in the example is that the negative plausibility check can be positively compensated for by means of questioning by an authorized person 42 if the person 42 considers this to be useful and has a corresponding public key 44 assigned to a corresponding authorization. However, this rule can also be changed by a higher ranked person according to a fundamental rule.

Provision may also be made for the decision made by the authorized person 42 to itself in turn be checked in an automated manner by a user 10 in the form of a higher ranking post. This user 10 may be, for example, a computer belonging to a central control entity which automatically checks all transactions/decisions in the block chain 24 and passes results to a checking team.

In the exemplary embodiment shown, the soldier 38 is approved in the network 2 and is sent to a location where he performs his duty. There, he uses his public key 40, for example, to log onto a weapon, for example a launcher 8, which reports this operation to the network 2, for example by means of a wireless connection 14 to the command center 4. The latter checks whether such logging-on is plausible and—if so—releases the soldier 38 and his weapons for communication in the network 2. The soldier 38 now performs his duty until he logs off from the network 2 again and then makes new approval in the network 2 necessary again for a person 42 authorized for this purpose.

The following is a summary list of reference numerals and the corresponding structure used in the above description of the invention:

2 System/network
4 Command center
6 Sensor system, radar system
8 Effector system, launcher 10 User
12 Data cable
14 Wireless connection
16 Canister
18 Data processing system
20 Database
22 Block
24 Block chain
26 Check code
28 Transaction
30 Basic block
32 Building
34 Operator
36 Radio network
38 Soldier
40 Key
42 Person
44 Key

The invention claimed is:

1. A method for protecting a networked military system from malicious users, which comprises the step of:
storing transactions between users of the networked military system in a distributed database, wherein the networked military system is an air defense system having, as the users, a command center, at least one sensor system for air monitoring and at least one effector system for averting threats.

2. The method according to claim 1, which further comprises storing the distributed database in a plurality of the users and is visible to all the users.

3. The method according to claim 1, which further comprises selecting the users from the group consisting of persons and vehicles.

4. The method according to claim 1, wherein the transactions at least contain information from the group of consisting of:
movement data relating to threats which are captured by a sensor system;
shots or orders to fire;
identification of the threats;
allocation of a target to an effector system;
logon data of the users in the networked military system;
states of the users;
geographical locations of the users; and
network rules.

5. The method according to claim 1, which further comprises storing the transactions in blocks which follow one another and contents of the blocks are networked to one another in such a manner that a check code formed from at least one preceding block is stored in a block.

6. The method according to claim 5, wherein a transaction among the users is considered to be true if the transaction is stored in the block and the block is attached to a chain of the blocks.

7. The method according to claim 1, which further comprises storing basic information relating to the users in a basic block which is created in an environment which is more protected in comparison with a subsequent regular operating environment.

8. The method according to claim 7, wherein a basic group of the users is defined in the basic block.

9. The method according to claim 7, which further comprises wiring the users to one another when creating the basic block.

10. The method according to claim 8, which further comprises networking the basic group only after a creation of the basic block.

11. The method according to claim 1, which further comprises networking the users to one another for interchanging certificates in a protected environment.

12. The method according to claim 1, which further comprises storing the transactions in blocks and the blocks are created according to a defined algorithm.

13. The method according to claim 12, wherein the defined algorithm proportionately divides rights for creating the blocks among the users.

14. The method according to claim 12, wherein the defined algorithm calculates a division of proportions among the users according to a data security of individual ones of the users.

15. The method according to claim 13, wherein the defined algorithm distributes the rights for creating the blocks according to a pseudo-random method.

16. The method according to claim 1, which further comprises storing the transactions in blocks and only the users registered in a basic block and approved new users can generate the blocks.

17. The method according to claim 1, wherein a user not yet approved in the networked military system is approved as a new user in the networked military system only when a user authorized for a new inclusion approves the new user.

18. The method according to claim 17, which further comprises registering the user authorized for the new inclusion as such in a basic block.

19. The method according to claim 17, wherein a decision to newly include the user is made by a person.

20. The method according to claim 17, wherein the new user is approved as an approved user in the networked military system only when at least one plausibility check with respect to the new user using information from blocks of a block chain is positive.

21. The method according to claim 1, which further comprises storing the transactions in blocks and only data relating to the users registered in a basic block and approved new users can be inserted into the blocks.

22. The method according to claim 1, which further comprises registering fundamental rules of the networked military system in a basic block.

23. The method according to claim 22, wherein at least one fundamental rule defines a creation of dynamic rules.

24. The method according to claim 22, wherein the fundamental rules of the networked military system are hardware-stored in at least one user.

25. The method according to claim 1, wherein the users are networked and a fundamental rule stored in a user is inserted into a basic block when creating the basic block.

26. A networked military system, comprising:
a plurality of users programmed to store transactions between the users of the networked military system in a distributed database, wherein the networked military system is an air defense system having, as the users, a command center, at least one sensor system for air monitoring and at least one effector system for averting threats.

* * * * *